Jan. 1, 1957  W. JONES  2,776,041
CORN PICKER APPARATUS
Filed Sept. 25, 1953  2 Sheets-Sheet 1
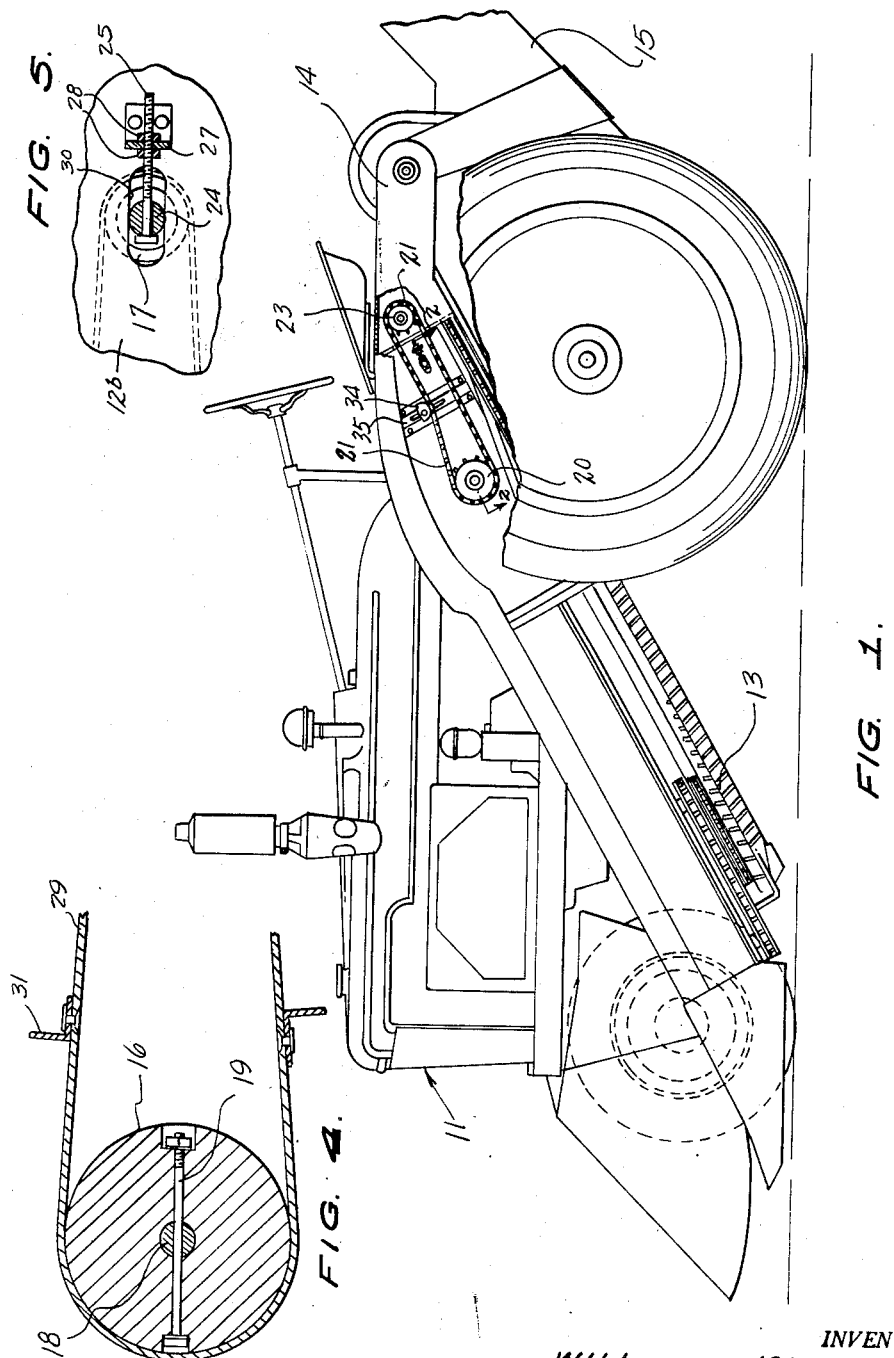
INVENTOR.
WILL JONES,
BY
McMorrow, Berman & Davidson
ATTORNEYS.

Jan. 1, 1957  W. JONES  2,776,041
CORN PICKER APPARATUS
Filed Sept. 25, 1953  2 Sheets-Sheet 2
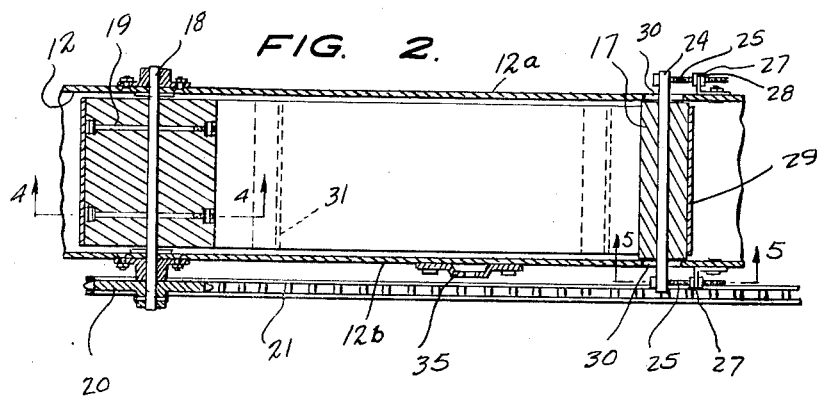
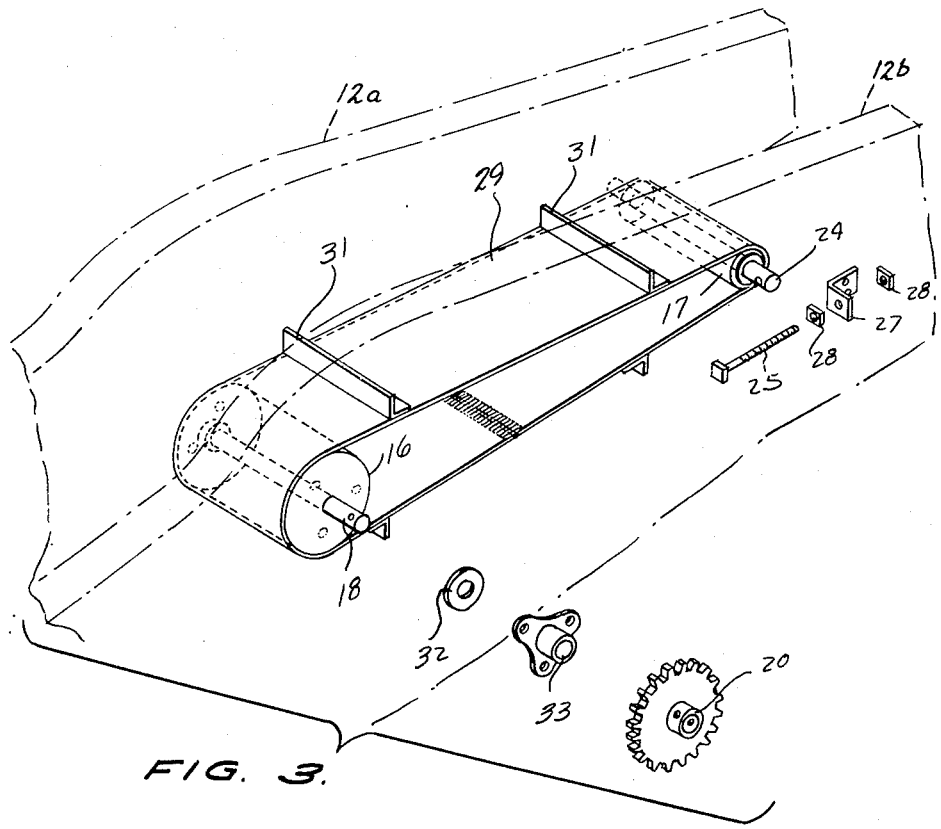
INVENTOR.
WILL JONES,
BY
McMorrow, Berman & Davidson
ATTORNEYS.

United States Patent Office 2,776,041
Patented Jan. 1, 1957

2,776,041
CORN PICKER APPARATUS
Will Jones, Arthur, Ill.

Application September 25, 1953, Serial No. 382,389

1 Claim. (Cl. 198—160)

This invention relates to harvesting machines, and more particularly to an improvement in a corn picker of the type having an upwardly and rearwardly directed discharge passage and means for conveying harvested corn along said passage.

The main object of the invention is to provide a novel and improved means for preventing the clogging of corn in the discharge passage of a corn picker of the International Harvester type, said attachment involving inexpensive components, being easy to install, and being arranged to eliminate clogging of the harvested corn at the upper end of the discharge passage of the machine.

A further object of the invention is to provide an improved anti-clogging device for use in a corn picker of the type having an upwardly and rearwardly directed discharge passage and means for conveying harvested corn along said passage, such as a corn picker of the International Harvester type, the improved anti-clogging means involving relatively simple components, being reliable in operation, and greatly improving the efficiency of operation of the corn picking machine by reducing the amount of time and labor involved in maintaining the machine in proper working order.

Further objects and advantages of the invention will become apparent from the following description and claim, and from the accompanying drawings, wherein:

Figure 1 is a side elevational view, partly broken away, of an International Harvester corn picker provided with an improved anti-clogging apparatus constructed and installed in accordance with the present invention.

Figure 2 is an enlarged cross sectional view taken on the line 2—2 of Figure 1 through the anti-clogging apparatus.

Figure 3 is a perspective view of the anti-clogging device of the present invention, the parts thereof being shown in separated positions.

Figure 4 is an enlarged cross sectional detail view taken on the line 4—4 of Figure 2.

Figure 5 is an enlarged cross sectional detail view taken on the line 5—5 of Figure 2.

Referring to the drawings, 11 designates a conventional International Harvester corn picking machine, said machine being of the type having an upwardly and rearwardly inclined passage or chute shown at 12 in Figure 2. Suitable conveyor means designated generally at 13 in Figure 1 are provided for conveying harvested corn upwardly along the chute 12, the conveying means 13 forming no part of the present invention and being well known to those skilled in the art.

Considerable difficulty in the operation of the International Harvester machine has been experienced, mainly due to the clogging of harvested corn at the upper rear portion of the discharge passage 12. In order to eliminate this difficulty, an anti-clogging device according to the present invention has been provided, said device being installed in the upper rear portion of the discharge passage 12 and being spaced above the bottom of the passage to allow harvested corn to move therethrough to the rear end 14 of the passage where the corn is fed to the intake of an elevator 15.

The illustrated anti-clogging device comprises a relatively large diameter front roller 16 and a relatively small diameter rear roller 17, journalled transversely in the side walls 12a and 12b of the chute 12. The roller 16 is secured to a transverse shaft 18 by a plurality of diametrically extending bolts 19 which extend diametrically through the shaft 18 and through roller 16, as shown in Figure 2, whereby the roller 16 is rigidly secured on the shaft. The shaft 18 extends outwardly from the passage 12 and has secured thereon a sprocket wheel 20 which is engaged by a sprocket chain 21, said chain being engaged on a drive sprocket 21 secured on a transverse drive shaft 23 which is coupled in any suitable manner to the driving means for the corn picking machine, such as for example, to the power takeoff shaft of the engine of the vehicle on which the machine is mounted.

The idler roller 17 is rotatably mounted on a transverse shaft 24 through the ends of which extend respective adjusting bolts 25, 25, said bolts extending through respective angle brackets 27, 27 secured to the side walls of passage 12, as shown in Figure 2, the bolts 25 being secured in adjusted positions relative to the brackets 27 by suitable lock nuts 28 provided on the bolts on opposite sides of brackets 27, as shown in Figure 2. Engaged on the rollers 16 and 17 and extending longitudinally through the passage 12 in the upper portion thereof is the flexible conveyor belt 29, said belt being only slightly smaller in width than the width of the passage 12 and being adjusted to a desired degree of tightness by the adjustment of the position of roller 17 provided in the manner above described by the bolts 25, 25. Respective longitudinally extending slots 30, 30 are provided on the opposite sides of passage 12 through which the ends of the shaft 24 extend, allowing the desired longitudinal adjustment of the shaft 24.

Transversely secured on the belt 29 are the respective, spaced, rigid angle bars 31, defining outwardly projecting vane elements on the conveyor belt, the belt being driven by the sprocket chain 21 in a direction to move the lower portion of the belt upwardly and rearwardly in the passage 12, whereby the vanes 31 provide an agitating and loosening action on ears of corn which may tend to clog in the upper rear portion of passage 12. Thus, when the device is in operation, the moving vanes 31 assist the corn which has accumulated in the upper rear portion in moving rearwardly to the end 14 of the discharge passage and into the intake of the elevator 15.

As shown in Figures 2 and 3, the ends of the transverse shaft 18 extend through spacer washers 32 and journal bearings 33, whereby the roller 16 is rotatably supported and is spaced slightly inwardly from the walls of discharge passage 12.

Suitable means is provided for maintaining the sprocket chain 21 in a substantially taut condition, for example, a weighted block member 34 is provided above the chain, said block member being slidably engaged in a guide channel 35 secured to the side wall of the harvester adjacent to and transverse to the sprocket chain 21, the block 34 being slidable along the channel 35 and engaging the top portion of the chain 21 to maintain said chain in a taut condition.

While a specific embodiment of an improved anti-clogging attachment for a corn picker of the International Harvester type has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a corn picker apparatus, a vehicle having a prime mover thereon, a rearwardly inclined chute mounted in said vehicle having a depressed forward ground engaging end and an elevated rear discharge end, a conveyor extending rearwardly in said chute from said forward end and terminating in a rear end at a point spaced from said rear end, said conveyor being operatively connected to said prime mover, an anti-clogging device extending along said chute between said rear end of said conveyor and the discharge end of the chute, said chute having a bottom and side walls, said device comprising a relatively large diameter front roller extending between and journalled in said side walls, a relatively small diameter rear roller extending between said side walls, means mounting said rear roller on said side walls for rotation and for movement toward and away from said front roller, an endless belt trained around said front and rear rollers, said belt having a lower flight running close to the chute bottom, paddles extending across said belt, said front roller having a shaft having an end extending through one of said side walls, and means operatively connecting said shaft end to said prime mover.

References Cited in the file of this patent
UNITED STATES PATENTS

| | | |
|---|---|---|
| 1,193,565 | Krunfus | Aug. 8, 1916 |
| 1,201,019 | Brudevold | Oct. 10, 1916 |
| 1,651,422 | Van Nortwick | Dec. 6, 1927 |